No. 635,397. Patented Oct. 24, 1899.
J. SCHLAEFER.
TREE PROTECTOR.
(Application filed June 16, 1899.)
(No Model.)
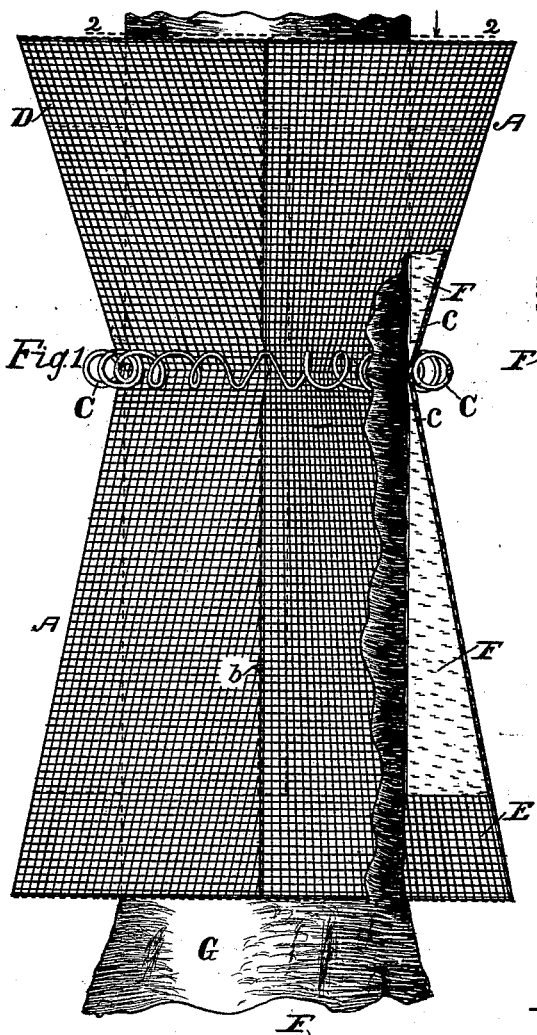
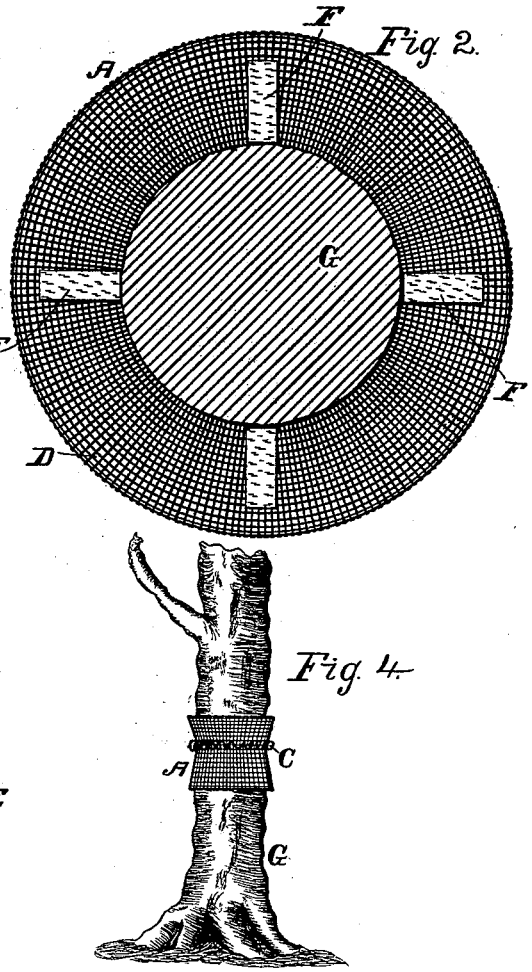
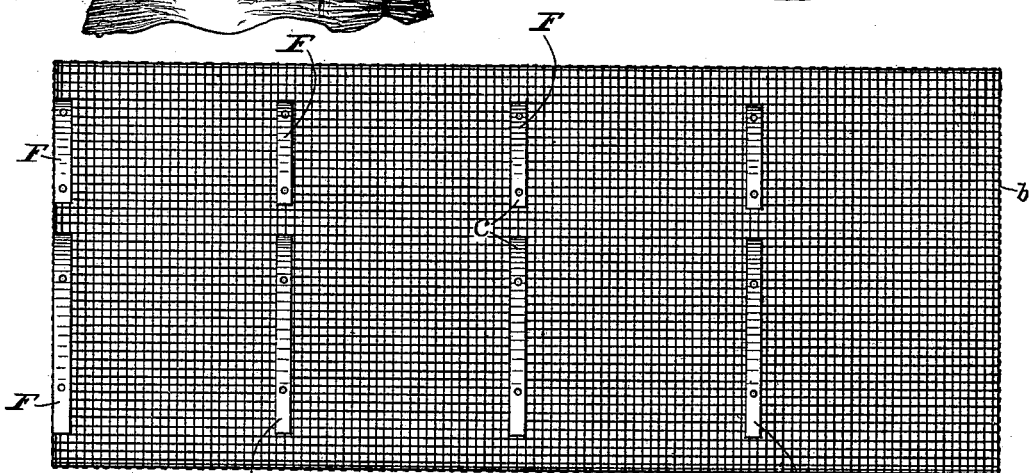
Attest:
M. L. Winston.
P. H. Costich.
Inventor:
J. Schlaefer,
By E. B. Whitmore, Atty.
THE NORRIS PETERS CO., PHOTO-LITHO., WASHINGTON, D. C.

UNITED STATES PATENT OFFICE.

JACOB SCHLAEFER, OF MENDON, NEW YORK.

TREE-PROTECTOR.

SPECIFICATION forming part of Letters Patent No. 635,397, dated October 24, 1899.

Application filed June 16, 1899. Serial No. 720,801. (No model.)

*To all whom it may concern:*

Be it known that I, JACOB SCHLAEFER, a citizen of the United States, residing at Mendon, in the county of Monroe and State of New York, have invented a new and useful Improvement in Tree-Protectors, which improvement is fully set forth in the following specification and shown in the accompanying drawings.

My invention is a protector for trees, the same being a device to be placed upon the trunk of a tree for the purpose of preventing insects and worms from crawling up and down the tree and for catching them in their passage in either direction.

The invention is hereinafter fully described, and more particularly pointed out in the claims.

Referring to the drawings, Figure 1 is a side elevation of the device partly broken away. Fig. 2 is a horizontal section of the tree-body, taken on the dotted line 2 2 in Fig. 1. Fig. 3, drawn to a smaller scale, shows the device opened out before being put upon the tree. Fig. 4, drawn to a small scale, shows the adaptation of the device to a tree.

In the drawings, A is a flexible perforated sheet, preferably of metal, as wire cloth or gauze, bent around the tree G and lapped, as shown. Secured transversely to this sheet A is a series of tapered spacers F, being preferably strips of wood each tapered to a point. When the sheet is put upon a tree, it is so placed that the strips are on the inside in vertical positions, bearing directly against the bark of the tree. These spacers are preferably secured to the sheet in pairs, one above the other, as shown in Fig. 3, with their pointed ends turned toward each other and slightly separated, the upper spacer of each pair being usually considerably shorter than the lower one. When the metal sheet is put upon a tree, it is bent to encircle the latter and lapped, the overlapping edge $b$ being tacked or nailed to the outer edges of a pair of spacers F. After being put upon the tree the yielding sheet is compressed or crimped near the middle between the pointed ends of the spacers and a yielding holder, as an ordinary spiral spring C, is stretched around it and its ends fastened together. This spring serves to hold the wire-cloth with sufficient firmness to the tree to keep it in place, and at the same time yields readily to the growth or expansion of the tree without injuriously binding or compressing the same, no nails, tacks, or other devices to pierce or injure the tree being employed to hold the metal sheet upon it. Thus placed upon the tree the upper and lower parts of the sheet flare and form chambers D and E, one above and the other below the holding-spring, into which the vermin crawl going in either direction and beyond which they cannot pass.

In case the tree is aged, with a rough bark, I usually place at the bottom of the upper chamber D a small quantity of rags, chaff, or other similar material to occupy the spaces between the projecting portions of the rough bark to prevent insects or vermin passing through.

The spacers F are preferably placed to have their upper and lower thick ends at some distance within or away from the adjacent edges of the metal sheet, as shown.

What I claim as my invention is—

1. A protector for trees, comprising a flexible perforated sheet to encircle the tree, provided with tapered spacers placed thereon in pairs to bear against the tree with their small ends adjacent, and a holder for the sheet, substantially as shown.

2. A tree-protector consisting of a flexible perforated sheet and tapered spacers secured to the sheet in pairs, with their smaller ends adjacent, the spacers being between the sheet and the tree, and a holder for the sheet pressing it closely to the body of the tree at the interval between the spacers, substantially as described.

In witness whereof I have hereunto set my hand this 13th day of June, 1899, in the presence of two subscribing witnesses.

JACOB SCHLAEFER.

Witnesses:
E. B. WHITMORE,
M. L. WINSTON.